United States Patent
Krissman et al.

(10) Patent No.: US 11,281,850 B2
(45) Date of Patent: Mar. 22, 2022

(54) SYSTEM AND METHOD FOR SELF-FILING CUSTOMS ENTRY FORMS

(71) Applicant: A9.com, Inc., Palo Alto, CA (US)

(72) Inventors: Charles Krissman, Los Angeles, CA (US); Christopher Reynolds, Philadelphia, PA (US); Andre Lamorgia, Philadelphia, PA (US); Tilghman Naylor, Los Angeles, CA (US)

(73) Assignee: A9.COM, INC., Palo Alto, CA (US)

( * ) Notice: Subject to any disclaimer, the term of this patent is extended or adjusted under 35 U.S.C. 154(b) by 327 days.

(21) Appl. No.: 15/857,097

(22) Filed: Dec. 28, 2017

(65) Prior Publication Data
US 2019/0332660 A1    Oct. 31, 2019

(51) Int. Cl.
*G06F 40/174* (2020.01)
*G06Q 10/08* (2012.01)
(Continued)

(52) U.S. Cl.
CPC ........ *G06F 40/174* (2020.01); *G06F 16/2272* (2019.01); *G06F 16/25* (2019.01); *G06Q 10/0831* (2013.01); *G06Q 10/0832* (2013.01)

(58) Field of Classification Search
CPC .... G06F 40/174; G06F 16/2272; G06F 16/25; G06Q 10/0831; G06Q 10/0832
See application file for complete search history.

(56) References Cited

U.S. PATENT DOCUMENTS 5,717,989 A * 2/1998 Tozzoli ................. G06Q 20/10
                                                  705/37
5,726,884 A * 3/1998 Sturgeon ............ G06Q 10/0631
                                                  705/7.12
(Continued)

FOREIGN PATENT DOCUMENTS

WO     WO-9934272 A2 *  7/1999  ......... G06Q 30/0609

OTHER PUBLICATIONS

Mizra Bin Mohamed, "Import Tax Compliance: a Study of Customs Agents in Malaysia Utilising the Theory of Planned Behaviour", published by University of Nottingham in 2016 (Year: 2016).*
(Continued)

*Primary Examiner* — Omar Zeroual
(74) *Attorney, Agent, or Firm* — Eversheds Sutherland (US) LLP

(57) ABSTRACT

A system and method are provided that present users with a platform to complete and self-file customs entry forms for goods transported across an international border, wherein the system and method enable the user to resolve a flagged exception from a customs agency through an automated computerized response or by using customs-broker resources via the digital network. The system further enables a user to validate submitted and cleared custom entry forms by setting parameters to dictate a level of auditing conducted by customs-broker resources. As such, users can readily complete and file the necessary customs entry forms while maintaining customs-broker resources on the back-end for selective auditing and resolving issues with a customs agency, thereby lowering associated overhead costs through a reduced dependency on customs-broker resources.

16 Claims, 11 Drawing Sheets

(51) Int. Cl.
*G06F 16/25* (2019.01)
*G06F 16/22* (2019.01)

(56) References Cited

U.S. PATENT DOCUMENTS

| | | | | |
|---|---|---|---|---|
| 5,926,822 A * | 7/1999 | Garman | G06F 40/18 | 715/201 |
| 5,968,110 A * | 10/1999 | Westrope | G06Q 30/02 | 238/381 |
| 6,128,617 A * | 10/2000 | Lowry | G06F 16/242 | |
| 6,141,666 A * | 10/2000 | Tobin | G06Q 30/02 | 715/207 |
| 6,163,732 A * | 12/2000 | Petke | G06Q 99/00 | 700/106 |
| 6,233,565 B1 * | 5/2001 | Lewis | G06Q 20/00 | 705/26.1 |
| 6,341,287 B1 * | 1/2002 | Sziklai | G06Q 10/06 | |
| 6,397,115 B1 * | 5/2002 | Basden | G05B 15/02 | 700/266 |
| 6,406,249 B1 * | 6/2002 | McAdams | B65D 88/022 | 244/137.1 |
| 6,460,020 B1 * | 10/2002 | Pool | G06Q 30/0601 | 705/7.29 |
| 6,463,419 B1 * | 10/2002 | Kluss | G06Q 10/08 | 705/330 |
| 6,536,659 B1 * | 3/2003 | Hauser | G06Q 30/06 | 235/375 |
| 6,567,789 B1 * | 5/2003 | Baker | G06Q 10/10 | 705/30 |
| 6,795,823 B1 * | 9/2004 | Aklepi | G06Q 10/08 | 707/781 |
| 7,050,995 B2 * | 5/2006 | Wojcik | G06Q 10/087 | 705/14.1 |
| D535,690 S * | 1/2007 | Fabel | D19/1 | |
| 7,312,702 B1 * | 12/2007 | Willms | G06Q 10/08 | 340/540 |
| 7,406,472 B2 * | 7/2008 | Manucha | G06Q 10/083 | 705/330 |
| 7,426,514 B2 | 9/2008 | Dutta et al. | | |
| 7,464,054 B2 * | 12/2008 | Chin | G06Q 10/02 | 705/37 |
| 7,512,594 B2 * | 3/2009 | Zhang | G06F 16/248 | |
| 7,542,991 B2 * | 6/2009 | Ouzounian | G16H 50/80 | |
| RE40,924 E * | 9/2009 | Nicholls | G06Q 10/06311 | 705/28 |
| 7,596,500 B1 * | 9/2009 | Thompson | G06Q 30/0284 | 705/1.1 |
| 7,657,539 B2 | 2/2010 | Dutta et al. | | |
| 7,676,389 B2 * | 3/2010 | Jackson | G06Q 10/08 | 705/7.12 |
| 7,725,406 B2 * | 5/2010 | Black | G06Q 10/0831 | 705/331 |
| 7,895,092 B2 * | 2/2011 | Amling | G06Q 30/0283 | 705/28 |
| 7,933,879 B2 * | 4/2011 | Ouzounian | G16H 50/80 | 707/694 |
| 8,065,237 B2 * | 11/2011 | Bennett | G06Q 30/0601 | 705/332 |
| 8,078,485 B1 * | 12/2011 | Kraehmueller | G06Q 10/063 | 705/7.11 |
| 8,099,371 B1 * | 1/2012 | Wade | G06Q 10/0831 | 705/331 |
| 8,156,007 B1 * | 4/2012 | Anthony | G06Q 30/0601 | 705/26.1 |
| 8,224,758 B2 * | 7/2012 | Humprecht | G06Q 10/08 | 705/332 |
| 8,255,411 B1 * | 8/2012 | Carpenter | G06F 16/24539 | 707/764 |
| 8,429,422 B1 * | 4/2013 | Hagan | H04L 67/02 | 713/190 |
| 8,495,068 B1 * | 7/2013 | Awalt | G06Q 30/06 | 707/740 |
| 8,548,880 B2 * | 10/2013 | Moschel | G06Q 40/123 | 705/31 |
| 8,671,120 B1 * | 3/2014 | Bicknell | G06Q 30/0601 | 707/804 |
| 8,725,656 B1 * | 5/2014 | Gill | G06Q 10/101 | 705/335 |
| 8,732,093 B2 * | 5/2014 | Mack | G06Q 10/0831 | 705/331 |
| 8,738,414 B1 * | 5/2014 | Nagar | G06Q 10/101 | 705/7.25 |
| 8,751,419 B2 * | 6/2014 | Shimogori | G06N 20/00 | 706/12 |
| 8,896,419 B2 | 11/2014 | Schattleitner et al. | | |
| 9,116,890 B2 * | 8/2015 | King | G06F 16/434 | |
| 9,195,939 B1 * | 11/2015 | Goyal | G06F 16/2246 | |
| 9,452,854 B1 * | 9/2016 | Godfrey | G06Q 10/0875 | |
| 9,563,874 B1 * | 2/2017 | McPhie | G06Q 10/10 | |
| 10,430,753 B2 * | 10/2019 | Felix | G06Q 20/00 | |
| 10,430,760 B2 * | 10/2019 | McCormick | G06Q 10/10 | |
| 10,460,366 B2 * | 10/2019 | Nishiura | G06Q 10/0832 | |
| 10,521,755 B2 * | 12/2019 | Yeager | G06Q 10/08345 | |
| 2001/0027471 A1 * | 10/2001 | Paulose | G06Q 30/06 | 709/203 |
| 2002/0010665 A1 * | 1/2002 | Lefebvre | G06Q 40/123 | 705/31 |
| 2002/0013739 A1 * | 1/2002 | O'Donnell | G06Q 20/383 | 705/26.81 |
| 2002/0019785 A1 * | 2/2002 | Whitman | G06Q 30/06 | 705/28 |
| 2002/0029155 A1 * | 3/2002 | Hetzel | G16H 70/40 | 705/2 |
| 2002/0032573 A1 * | 3/2002 | Williams | G06Q 10/08 | 705/335 |
| 2002/0032668 A1 * | 3/2002 | Kohler | G06Q 30/06 | 705/401 |
| 2002/0049622 A1 * | 4/2002 | Lettich | G06Q 10/08 | 705/7.11 |
| 2002/0055963 A1 * | 5/2002 | Kanemasa | G06Q 10/06 | 718/102 |
| 2002/0091574 A1 * | 7/2002 | Lefebvre | G06Q 40/02 | 705/19 |
| 2002/0095355 A1 * | 7/2002 | Walker | G06Q 50/188 | 705/80 |
| 2002/0116273 A1 * | 8/2002 | Sundel | G06Q 20/207 | 705/19 |
| 2002/0116318 A1 * | 8/2002 | Thomas | G06Q 10/08 | 705/37 |
| 2002/0120561 A1 * | 8/2002 | Chin | G06Q 10/02 | 705/38 |
| 2002/0152174 A1 * | 10/2002 | Woods | G06Q 10/08 | 705/60 |
| 2002/0178074 A1 * | 11/2002 | Bloom | G06Q 10/08 | 705/26.81 |
| 2002/0184119 A1 * | 12/2002 | Gagne | G06Q 10/08 | 705/29 |
| 2002/0198752 A1 * | 12/2002 | Stiffler | G06Q 10/10 | 705/331 |
| 2003/0004735 A1 * | 1/2003 | Dutta | G06Q 50/265 | 705/325 |
| 2003/0009361 A1 * | 1/2003 | Hancock | G06Q 10/0875 | 709/219 |
| 2003/0009396 A1 * | 1/2003 | DeVries | G06Q 10/087 | 705/28 |
| 2003/0023522 A1 * | 1/2003 | Dutta | G06Q 30/0283 | 705/31 |
| 2003/0036982 A1 * | 2/2003 | Tang | G06Q 10/087 | 705/28 |
| 2003/0040947 A1 * | 2/2003 | Alie | G06Q 30/06 | 705/28 |
| 2003/0041033 A1 * | 2/2003 | Kaplan | G06Q 10/0831 | 705/64 |
| 2003/0046220 A1 * | 3/2003 | Kamiya | G06Q 40/04 | 705/37 |
| 2003/0061058 A1 * | 3/2003 | Dutta | G06Q 10/06 | 705/311 |

(56) References Cited

U.S. PATENT DOCUMENTS

| | | | |
|---|---|---|---|
| 2003/0069831 A1* | 4/2003 | Le | G06Q 30/06 705/37 |
| 2003/0078885 A1* | 4/2003 | Felton | G06Q 30/02 705/40 |
| 2003/0097287 A1* | 5/2003 | Franz | G06Q 10/087 705/28 |
| 2003/0105704 A1* | 6/2003 | Sundel | G06Q 10/0833 705/37 |
| 2003/0115072 A1* | 6/2003 | Manucha | G06Q 20/085 707/770 |
| 2003/0144863 A1* | 7/2003 | Liu | G06Q 10/0831 705/331 |
| 2003/0144971 A1* | 7/2003 | Das | G06Q 20/20 705/401 |
| 2003/0154143 A1* | 8/2003 | Chen | G06Q 10/08 705/28 |
| 2003/0163447 A1* | 8/2003 | Sandman | G06Q 10/10 |
| 2003/0167240 A1* | 9/2003 | Napier | G06Q 10/08 705/404 |
| 2003/0171948 A1* | 9/2003 | Thomas | G06Q 10/08 705/331 |
| 2003/0171962 A1* | 9/2003 | Hirth | G06Q 10/06315 705/7.25 |
| 2003/0172007 A1* | 9/2003 | Helmolt | G06Q 10/06316 705/28 |
| 2003/0191652 A1* | 10/2003 | Li | G06Q 10/0831 705/331 |
| 2003/0195815 A1* | 10/2003 | Li | G06Q 10/10 705/26.44 |
| 2003/0236688 A1* | 12/2003 | Kadaba | G06Q 30/0283 705/6 |
| 2004/0019569 A1* | 1/2004 | Lee | G06Q 30/06 705/64 |
| 2004/0049446 A1* | 3/2004 | Seljeseth | G06Q 40/04 705/37 |
| 2004/0083233 A1* | 4/2004 | Willoughby | G06Q 10/083 |
| 2004/0088245 A1* | 5/2004 | Narayan | G06Q 20/209 705/38 |
| 2004/0098356 A1* | 5/2004 | Shabtai | G06Q 10/10 706/45 |
| 2004/0102991 A1* | 5/2004 | Casey | G06Q 10/0831 705/331 |
| 2004/0107110 A1* | 6/2004 | Gottlieb | G06Q 10/047 705/6 |
| 2004/0117373 A1* | 6/2004 | Yeung | G06Q 10/08 |
| 2004/0122690 A1* | 6/2004 | Willoughby | G06Q 30/02 705/337 |
| 2004/0149823 A1* | 8/2004 | Aptekar | G06Q 10/08 235/385 |
| 2004/0172260 A1* | 9/2004 | Junger | G06Q 30/016 705/21 |
| 2004/0193435 A1* | 9/2004 | Fang | G06Q 10/0831 709/203 |
| 2004/0193471 A1* | 9/2004 | Ozaki | G06Q 10/0831 705/331 |
| 2004/0194056 A1* | 9/2004 | Combs | G06Q 30/016 717/104 |
| 2004/0215480 A1* | 10/2004 | Kadaba | B07C 3/00 705/338 |
| 2004/0215531 A1* | 10/2004 | Stashluk, Jr. | G06Q 10/087 705/28 |
| 2004/0215588 A1* | 10/2004 | Cornelius | G06Q 10/025 |
| 2004/0243484 A1* | 12/2004 | Smith | G06Q 30/0601 705/26.1 |
| 2004/0243690 A1* | 12/2004 | Hancock | G06Q 10/06315 709/219 |
| 2005/0004894 A1* | 1/2005 | Uy | G06Q 10/0875 |
| 2005/0006470 A1* | 1/2005 | Mrozik | G06Q 10/08 235/385 |
| 2005/0033592 A1* | 2/2005 | Uy | G06Q 10/0831 705/331 |
| 2005/0075955 A1* | 4/2005 | Milovina-Meyer | G06Q 40/12 705/30 |
| 2005/0086132 A1* | 4/2005 | Kanitz | G06Q 10/08 705/28 |
| 2005/0114219 A1* | 5/2005 | Sultan | G06Q 30/0278 705/20 |
| 2005/0119926 A1* | 6/2005 | Turetsky | G06Q 10/0831 705/331 |
| 2005/0131843 A1* | 6/2005 | Sansone | G07B 17/00024 705/410 |
| 2005/0149453 A1* | 7/2005 | Amling | G06Q 10/087 705/60 |
| 2005/0182650 A1* | 8/2005 | Maddox | G06Q 10/06311 705/305 |
| 2005/0187874 A1* | 8/2005 | Sanal | G06Q 10/10 705/40 |
| 2005/0222853 A1* | 10/2005 | Black | G06Q 10/0831 705/331 |
| 2005/0262161 A1* | 11/2005 | Holmes | G06Q 10/10 |
| 2005/0289168 A1* | 12/2005 | Green | G06F 16/3322 |
| 2006/0015418 A1* | 1/2006 | Holmes | G06Q 10/06 705/30 |
| 2006/0015469 A1* | 1/2006 | Whitehouse | G07B 17/00508 705/410 |
| 2006/0036407 A1* | 2/2006 | Smith | G06Q 10/087 702/188 |
| 2006/0036504 A1* | 2/2006 | Allocca | G06Q 30/0601 705/26.1 |
| 2006/0059009 A1* | 3/2006 | Potts | G06Q 10/0831 705/317 |
| 2006/0080347 A1* | 4/2006 | Potts | G06Q 10/087 |
| 2006/0085201 A1* | 4/2006 | Sultan | G06Q 99/00 705/31 |
| 2006/0136309 A1* | 6/2006 | Horn | G06Q 30/0253 705/26.8 |
| 2006/0148446 A1* | 7/2006 | Karlsson | H04M 15/83 455/406 |
| 2006/0156262 A1* | 7/2006 | Abe | G01R 31/318342 716/103 |
| 2006/0224426 A1* | 10/2006 | Goossens | G06Q 50/188 705/80 |
| 2006/0241985 A1* | 10/2006 | Arnold | G06Q 10/025 705/6 |
| 2006/0247958 A1* | 11/2006 | Chelniak | G06Q 10/0831 705/331 |
| 2006/0253339 A1* | 11/2006 | Singh | G06Q 20/02 705/26.41 |
| 2006/0282277 A1* | 12/2006 | Ng | G06Q 10/0831 705/333 |
| 2007/0043579 A1* | 2/2007 | Kent | G06Q 30/0283 705/26.1 |
| 2007/0055584 A1* | 3/2007 | Chelniak | G06Q 10/08 705/28 |
| 2007/0073734 A1* | 3/2007 | Doan | G06F 16/83 |
| 2007/0095904 A1* | 5/2007 | Barta | G06Q 10/08 235/384 |
| 2007/0156281 A1* | 7/2007 | Leung | G06Q 10/087 700/225 |
| 2007/0192215 A1* | 8/2007 | Taylor | G06Q 10/087 705/28 |
| 2007/0226084 A1* | 9/2007 | Cowles | G06Q 30/06 705/26.62 |
| 2007/0299791 A1* | 12/2007 | Mack | G06Q 10/08 705/402 |
| 2008/0071627 A1* | 3/2008 | Junger | G06Q 20/203 705/22 |
| 2008/0071633 A1* | 3/2008 | Ozkan | G06Q 30/04 705/7.36 |
| 2008/0091577 A1* | 4/2008 | Holmes | G06Q 20/102 705/30 |
| 2008/0097933 A1* | 4/2008 | Awaida | G06Q 10/10 705/400 |
| 2008/0114643 A1* | 5/2008 | Milovina-Meyer | G06Q 30/04 705/14.13 |
| 2008/0126157 A1* | 5/2008 | Rousso | G06Q 10/087 705/348 |

(56) References Cited

U.S. PATENT DOCUMENTS

| | | | | |
|---|---|---|---|---|
| 2008/0126218 A1* | 5/2008 | Alvarado | G06Q 20/40 | 705/330 |
| 2008/0162305 A1* | 7/2008 | Rousso | G06Q 20/40 | 705/26.5 |
| 2008/0228712 A1* | 9/2008 | Nomura | G08G 1/0968 | |
| 2008/0255863 A1* | 10/2008 | Mack | G06Q 10/10 | 705/1.1 |
| 2008/0288274 A1* | 11/2008 | Roccagiovine | G06Q 10/08 | 705/1.1 |
| 2008/0294536 A1* | 11/2008 | Taylor | G06Q 10/08 | 705/28 |
| 2008/0302866 A1* | 12/2008 | Baugh | G06Q 10/08 | 235/375 |
| 2009/0037203 A1* | 2/2009 | Gallagher | G06Q 30/06 | 705/300 |
| 2009/0043672 A1* | 2/2009 | Ourega | G06Q 30/0613 | 705/26.41 |
| 2009/0089145 A1* | 4/2009 | Kent | G06Q 50/28 | 705/7.12 |
| 2009/0094542 A1* | 4/2009 | McKelvey | G06Q 10/00 | 715/765 |
| 2009/0138379 A1* | 5/2009 | Scheman | G06Q 30/06 | 705/26.1 |
| 2009/0144070 A1* | 6/2009 | Psota | G06Q 10/083 | 705/330 |
| 2009/0210243 A1* | 8/2009 | Pento | G06Q 10/0831 | 705/346 |
| 2009/0254445 A1* | 10/2009 | Bennett | G06Q 10/083 | 705/26.1 |
| 2009/0322510 A1* | 12/2009 | Berger | G06Q 10/0833 | 340/539.1 |
| 2010/0023422 A1* | 1/2010 | Thompson | G06Q 40/123 | 705/26.1 |
| 2010/0067041 A1* | 3/2010 | Endruscheit | G07B 17/00508 | 358/1.15 |
| 2010/0185931 A1* | 7/2010 | Mayer | G06Q 10/08 | 715/224 |
| 2010/0257114 A1* | 10/2010 | Amling | G06Q 30/0283 | 705/331 |
| 2010/0332284 A1* | 12/2010 | Hilbush | G06Q 10/0835 | 705/330 |
| 2011/0035297 A1* | 2/2011 | Chao | G06Q 30/08 | 705/27.1 |
| 2011/0060747 A1* | 3/2011 | Rose | G06F 16/313 | 707/750 |
| 2011/0066549 A1* | 3/2011 | Whitehouse | G07B 17/00508 | 705/39 |
| 2011/0145107 A1* | 6/2011 | Greco | G06Q 30/0643 | 705/27.2 |
| 2011/0161249 A1* | 6/2011 | Whitehouse | G06Q 20/10 | 705/402 |
| 2011/0213700 A1* | 9/2011 | Sant'Anselmo | G06Q 20/10 | 705/39 |
| 2011/0218898 A1* | 9/2011 | Chelniak | G06Q 10/083 | 705/34 |
| 2011/0307361 A1* | 12/2011 | Parameswaran | G06Q 30/04 | 705/34 |
| 2012/0066153 A1* | 3/2012 | Whitehouse | G07B 17/00193 | 705/407 |
| 2012/0078805 A1* | 3/2012 | Monz-Schneider | G06Q 10/0831 | 705/331 |
| 2012/0109765 A1* | 5/2012 | Araque | G06Q 20/12 | 705/26.1 |
| 2012/0123921 A1* | 5/2012 | Black | G06Q 10/08 | 705/34 |
| 2012/0130927 A1* | 5/2012 | Shimogori | G06N 20/00 | 706/12 |
| 2013/0006821 A1* | 1/2013 | Pirrello | G06Q 50/28 | 705/34 |
| 2013/0060658 A1* | 3/2013 | Quan | G06Q 30/06 | 705/26.25 |
| 2013/0090998 A1* | 4/2013 | Shimogori | G06Q 30/0609 | 705/14.23 |
| 2013/0218723 A1* | 8/2013 | Masud | G06Q 30/06 | 705/26.62 |
| 2013/0222136 A1* | 8/2013 | An | G08B 13/2465 | 340/572.1 |
| 2013/0275466 A1* | 10/2013 | Xiao | G06F 16/245 | 707/769 |
| 2013/0323476 A1* | 12/2013 | Farrell | B29C 66/306 | 428/195.1 |
| 2014/0032485 A1* | 1/2014 | Perelman | G06F 40/174 | 707/608 |
| 2014/0101069 A1* | 4/2014 | Choi | G06Q 10/0833 | 705/330 |
| 2014/0122368 A1* | 5/2014 | Gittleman | G06Q 10/0832 | 705/332 |
| 2014/0156298 A1* | 6/2014 | Crawford | G16H 10/60 | 705/2 |
| 2014/0229337 A1* | 8/2014 | Wang | G06Q 30/00 | 705/26.81 |
| 2014/0258032 A1* | 9/2014 | Psota | G06Q 30/0609 | 705/26.35 |
| 2014/0258098 A1* | 9/2014 | Felix | G06Q 40/02 | 705/39 |
| 2014/0279440 A1* | 9/2014 | Felix | G06Q 10/08345 | 705/39 |
| 2014/0279648 A1* | 9/2014 | Whitehouse | G06Q 10/083 | 705/330 |
| 2014/0379603 A1* | 12/2014 | Bodenhamer | G06Q 10/083 | 705/330 |
| 2015/0019454 A1* | 1/2015 | Helseth | G06Q 10/0831 | 705/331 |
| 2015/0034720 A1* | 2/2015 | Minogue | G06Q 10/0832 | 235/385 |
| 2015/0073929 A1* | 3/2015 | Psota | G06Q 30/0605 | 705/26.2 |
| 2015/0088776 A1* | 3/2015 | Parrish | G06Q 10/00 | 705/325 |
| 2015/0248639 A1* | 9/2015 | Maney | G06Q 10/08345 | 705/335 |
| 2015/0347390 A1* | 12/2015 | Tewari | G06Q 30/018 | 704/9 |
| 2016/0078038 A1* | 3/2016 | Solanki | G06F 16/345 | 707/727 |
| 2016/0125423 A1* | 5/2016 | Nour | G06Q 10/0831 | 705/317 |
| 2016/0180286 A1* | 6/2016 | Farley | G06Q 10/0831 | 705/331 |
| 2016/0275447 A1* | 9/2016 | Bennett | G06Q 10/0832 | |
| 2016/0275448 A1* | 9/2016 | Bennett | G06Q 10/083 | |
| 2017/0046656 A1* | 2/2017 | Bramble | G06Q 10/0831 | |
| 2017/0346925 A1* | 11/2017 | Lungi | H04L 67/34 | |
| 2018/0096175 A1* | 4/2018 | Schmeling | G06Q 10/08 | |
| 2019/0180291 A1* | 6/2019 | Schmeling | G16H 20/10 | |
| 2019/0251508 A1* | 8/2019 | Beckwitt | G06Q 10/08355 | |
| 2020/0057987 A1* | 2/2020 | Schrade | G06Q 10/0831 | |
| 2020/0134551 A1* | 4/2020 | Singh | G06Q 20/027 | |
| 2020/0167726 A1* | 5/2020 | Lee | G06Q 10/0831 | |
| 2020/0242300 A1* | 7/2020 | White | G06F 3/04817 | |

OTHER PUBLICATIONS

US Customs and Border Protection, EPA Supplemental Guidelines, CBP and Trade Automated Interface Requirements, Mar. 21, 2017, 149 pages, Version 9.1.

US Customs and Border Protection, FDA Supplemental Guidance for the Automated Commercial Environment/International Trade Data System (ACE/ITDS) Version 2.5, CBP and Trade Automated Interface Requirements, Dec. 28, 2016, 340 pages, Version 2.5.

US Customs and Border Protection, USDA APHIS Lacey Act Samples, CBP and Trade Automated Interface Requirements, May 2016, 19 pages, Version 3.1.

US Customs and Border Protection, Implementation Guide—PGA Message Set for Shipments Subject to NHTSA Regulations, CBP and Trade Automated Interface Requirements, Feb. 1, 2016, 89 pages.

(56) References Cited

OTHER PUBLICATIONS

US Customs and Border Protection, ACE Cargo Manifest/Entry Release Query, CBP and Trade Automated Interface Requirements, Apr. 2016, 63 pages.
US Customs and Border Protection, ACE Cargo Release, CBP and Trade Automated Interface Requirements, Aug. 10, 2017, 91 pages, Version 20.1.
US Customs and Border Protection, Entry Summary Create/Update, CBP and Trade Automated Interface Requirements, Oct. 2016, 197 pages.
US Customs and Border Protection, ACE Entry Summary Status Notification, CBP and Trade Automated Interface Requirements, Sep. 2016, 31 pages, Version 14.
US Customs and Border Protection, Document Image System (DIS) Implementation Guide, ACE Automated Broker Interface Automated Interface and Email Requirements, Oct. 2016, 71 pages, Version 1.0.
US Department of Transportation National Highway Traffic Safety Administration, Importation of Motor Vehicles and Motor Vehicle Equipment Subject to Federal Motor Vehicle Safety, Bumper and Theft Prevention Standards, Declaration, May 2006, 1 page.
United States Environmental Protection Agency, Importation of Motor Vehicles and Motor Vehicle Engines Subject to Federal Air Pollution Regulations, Declaration Form, Jul. 2017, 2 pages.

\* cited by examiner

| Seller | Invoice Number | PO Number |
|---|---|---|
| Yangzhou Huini Import & Export Co. Ltd. | BURA16A07 | 161017FW |

⊙ Add Manufacturer (if differs from Supplier) ⓘ

Country of Origin   Currency

| China | USD |
|---|---|

⊙ Freight & Insurance Cost ⓘ
⊙ Adjustment Cost ⓘ

PRODUCTS ────────────────────────

| Item (SKU) | Quantity | Unit Value | Total Cost |
|---|---|---|---|
| BUR06FJ-XL | 225 | 80.50 | 11,112.50 |

⌄ Additional Line Detail

HTS | 6113.00.9015 | ⓘ

Description | KNIT FRONTIER JACKET, 100% MAN-MADE FIBER, MEN'S, FULL-LENGTH ZIPPER FRONT, HOODED, SYRUP COLOR Country of Origin | China SPI | None | ⓘ

Reporting Quantity | 19 doz | 61 net kg | ⓘ

─────────────────────────────────

⊕ ADD ANOTHER PRODUCT

SYSTEM AND METHOD FOR SELF-FILING CUSTOMS ENTRY FORMS

FIELD OF THE INVENTION

The present invention relates generally to filing customs entry forms and, more particularly, enabling importers to self-file customs entry forms with customs-broker resources on the back-end.

BACKGROUND OF THE INVENTION

The customs brokerage industry has become a vital and in some cases, expensive overhead cost for people and organizations seeking to transport goods across international borders. For the United States (U.S.), this proliferation of the customs brokerage industry was in part due to the Customs Modernization Act (CMA) of 1993, which shifted the burden of accurately declaring merchandise from the government onto the importing community. The CMA established the clear requirement that parties must exercise "reasonable care" when importing, meaning that an importer of record must use "reasonable care" to make entry by filing such information as is necessary to enable the U.S. Customs and Border Protection Agency (CBP) to determine whether the goods may be released from customs custody. The importer of record thus must use "reasonable care" when completing the entry form with the declared value, goods classification, rate of duty, and such other documentation or information as is necessary to enable the CBP to properly assess duties, collect accurate statistics, and determine whether any other applicable requirement of law is met.

Given that there can be numerous regulations for a given type of good that must be adhered to in order to gain entry into a country, customs brokers are retained to ensure such adherence to the regulations, which includes ensuring appropriate documentation is filed and adequate duties are calculated. Customs brokers further act as a liaison between the people/organization and a government agency, such as the CBP, stepping in to resolve any issues that may exist. Moreover, the use of a licensed customs broker is deemed by Congress as possibly satisfying the "reasonable care" duty by an importer.

People and organizations have become more heavily dependent on customs brokers, thereby resulting in such associated overhead costs becoming a permanent expenditure when importing goods into a country. As such, the rise of technology has allowed for remote customs entry form filing, thereby opening the gateway for an importer to self-file an entry form with a given government agency. However, several practical hurdles exist with self-filing, particularly in the U.S., that may deter an importer from assuming any responsibilities associated with filing customs entry forms. First, importers must have special software approved by the CBP to self-file and transmit the entry form information digitally. This Automated Broker Interface ("ABI") software can be licensed off-the-shelf from a number of vendors, but most ABI software have a convoluted and codified interface that is designed for a customs broker, not the importer, thereby leading to possible errors and even potential breach of "reasonable care" by the importer. The CBP publishes the communication specifications for anyone who wants to build their own ABI software, but that is also a huge hurdle.

Second, importers must have a filer code to file entries to certain customs agencies, such as the CBP. Although obtaining a filer code is not particularly difficult, the importer is still responsible for submitting an application when making a request for a filer code. Third, by self-filing, an importer removes the buffer that a customs broker provides in dealing with a government agency, which includes addressing comments and exceptions flagged by the government agency when reviewing an entry form, such as a request to examine a container or entry rejection. The importer may not be apt nor have the resources or time to address such comments. Finally, as aforementioned, by self-filing, the duty of "reasonable care" may always be in question given the potential inexperience by a given importer in either filing an entry form or using complicated software.

It should, therefore, be appreciated that there exists a need for a system and method that provides importers a hybrid approach to self-filing a customs entry form by maintaining customs-broker resources on the back-end for auditing and resolving issues, thereby providing a presumption of satisfying the duty of reasonable care. The present invention fulfils this need and others.

SUMMARY OF THE INVENTION

Briefly, and in general terms, the invention provides a system and, related method, for an importer to self-file customs entry forms relating to the importation of goods across an international border, wherein the system and method automatically addresses and/or notifies customs-broker resources of any exceptions flagged by a governing customs agency. The system and method will further enable an importer to prescribe a level of auditing conducted by the customs-broker resources to ensure accuracy and compliance with applicable regulations. The completion and filing of customs entry forms can be pursued by any interested user e.g., individual, and/or organization, with a minimal need for customs-broker resources.

More specifically, by example and not limitation, the system includes a database management system, which maintains detailed data relating to an importer, the importer's product library, a tariff schedule issued by a respective country, and types of flagged exceptions for submitted entry forms from a customs agency. The system further includes modules to generate a customs entry form filing with associated tariffs and fees, and allow for system assisted resolutions to any customs agency identified exceptions. The modules include an entry populating module, a tariff module that itself includes a plurality of modules, a customs interface module, an exceptions mitigation module, a summary packet module and an audit module. Additionally, the system can be located on a cloud server, thereby allowing access to users from any device with internet connectivity.

In a detailed aspect of an exemplary embodiment, an entry population module receives input from a user, including information regarding the in-bound shipment along with commercial documents and invoices, and provides a platform for the user to populate a customs entry form, including the correct regulatory information as accessed via the DBMS. In another detailed aspect of the exemplary embodiment, the entry population module enables the user to request customs-broker resources, who may also serve as the system administrator, to populate the customs entry form.

In another detailed aspect of the exemplary embodiment, a tariff module will enable a user to verify a selected goods classification, and/or enable the system to classify the goods using image recognition software, with subsequent validation by customs-broker resources. The tariff module may further include additional modules that enable the user to determine the applicable regulatory information and/or duties required for the in-bound shipment.

In another detailed aspect of an exemplary embodiment, a customs interface module interacts with a remote customs server for a respective country, enabling the user to among others, file entry forms, approve and/or modify duties and associated fees, receive notification of exceptions from the respective customs agency, and transmit mitigated measures addressing said exceptions. The customs interface module further translates EDI messages received into nonprofessional terms understood by a user.

In yet another detailed aspect of an exemplary embodiment, an exceptions mitigation module determines, via accessing the DBMS, whether the system can automatically address a received flagged exception, or whether the system must use customs-broker resources for a resolution.

In yet another detailed aspect of an exemplary embodiment, a summary packet module compiles all the relevant information for a cleared in-bound shipment into an entry summary packet, which is specifically classified and readily available for the minimum number of years required by a customs agency for potential auditing.

In yet another detailed aspect of an exemplary embodiment, an audit module will assign entry fields of a completed and cleared entry form to customs-broker resources for auditing, wherein the number of entry fields will be determined based either on a user prescribed level of auditing, or a minimum number of randomly selected entry fields submitted with the entry form.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which:

FIG. 9B depicts a screenshot of the entry populating module of the system in FIG. 1 depicting populated information regarding the goods to be imported.

FIG. 9C depicts a screenshot of the entry populating module of the system in FIG. 1 depicting populated information regarding the destination of the goods to be imported.

DETAILED DESCRIPTION OF THE PREFERRED EMBODIMENTS

Figure 1:
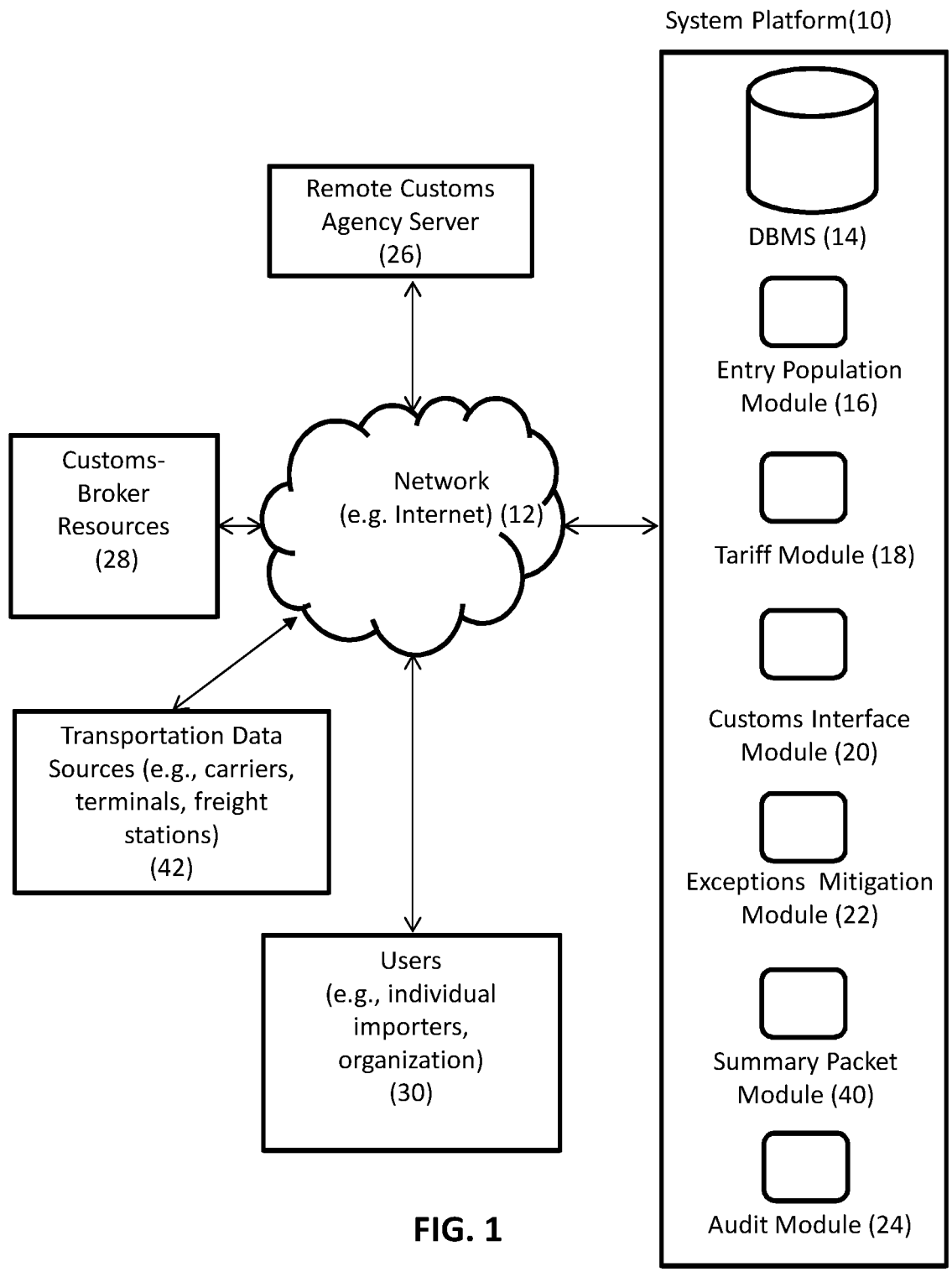
FIG. 1 depicts a simplified block diagram of a system in accordance with the invention.

Referring now to the drawings, and particularly FIG. 1, there is shown a computerized system 10 that provides users 30 with a platform to complete and self-file customs entry forms to a respective remote customs agency server 26, wherein the system 10 is configured to address exceptions received from a customs agency either automatically or by using customs-broker resources 28 to provide a resolution. The system 10 is further configured to validate submitted and cleared entry forms by assigning a number of entry fields of an entry form to be audited by customs-broker resources 28, wherein the number of entry fields selected is based either on user 30 set preferences or on a specified minimum number of entry fields submitted with the entry form. As such, users 30 can readily complete and file the necessary customs entry forms while providing customs-broker resources access and functionality on the back-end for selective auditing and resolving complex issues with a customs agency, thereby reducing the dependency on customs-broker resources, leading to lower associated overhead costs.

Figure 2:
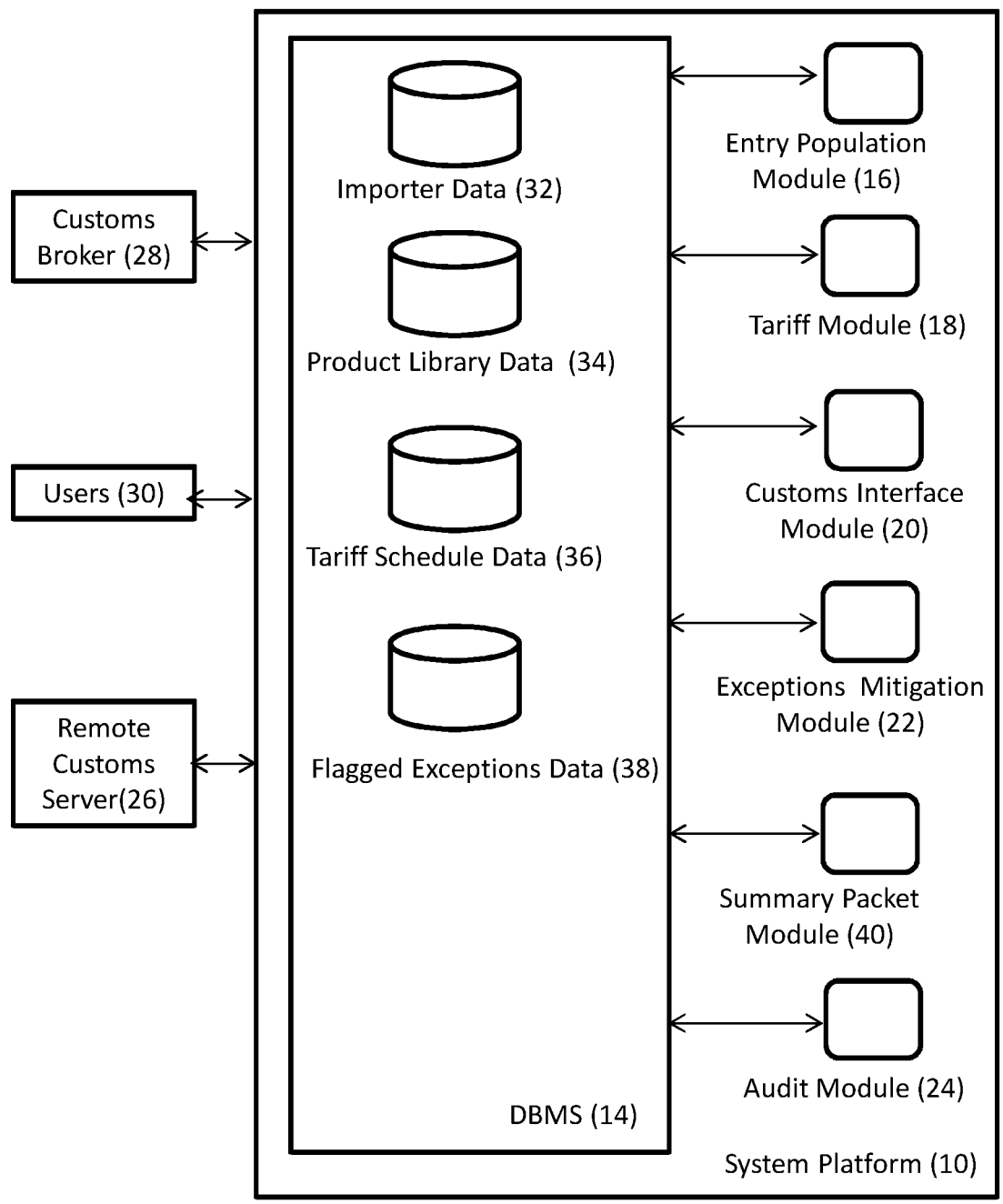
FIG. 2 depicts a simplified block diagram of a database management system (DBMS) of the system in FIG. 1.

With reference to FIG. 1 and FIG. 2, the system 10 includes a database management system (DBMS) 14 that maintains detailed data relating to importer information 32, the importer's product library 34, a tariff schedule 36 with regulatory information corresponding to different types of goods, and types of flagged exceptions 38 from a respective customs agency. The system 10 includes an entry-populating module 16, at tariff module 18, and customs interface module 20, together enabling a user to populate and file a customs entry form with computed tariffs and fees. The system 10 further includes an exceptions mitigation module 22 that allows the system to either automatically address a flagged exception or use customs-broker resources 28 to provide a resolution. The system 10 also includes a summary packet module 40 that automatically creates an entry summary packet for the cleared in-bound shipment, and an audit module 24 to enable selective auditing of the created entry summary packet by customs-broker resources 28.

With reference now to FIG. 2, there is shown a simplified block diagram of database management system (DBMS) 14 of the system. The system gathers data from users such as an importer 30, custom-broker resources 28, and a remote customs server 26 via the digital network 12, e.g., internet, to populate the DBMS 14. An example of the remote customs server 26 is the Automated Commercial Environment (ACE), used in the United States (U.S.) by the Customs and Border Protection Agency (CBP). As aforementioned, the DBMS 14 maintains detailed data relating to importers 32, the importer product library 34, a tariff schedule 36 with regulatory data for the different types of goods, and types of flagged exceptions 38 received from a customs agency regarding a submitted customs entry form.

Importer data 32 includes information regarding the importer, such as name, address, buyers, sellers, and/or manufacturer information that are associated with the importer, and applicable freight and/or carrier information. Information regarding the goods associated with the importer is stored in the product library 34. Such information can include name, description, SKU number, and if the goods have been classified, the corresponding goods classification reference code (tariff code) associated with a given customs agency, with the applicable regulatory information. An example of a tariff code is the Harmonized Tariff Schedule of the US (HTSUS) used by the CBP.

The tariff schedule 36 includes the corresponding regulatory information and duties required for all types of goods that are imported, wherein the goods are identified by the respective tariff code used by the customs agency, such as HTSUS. Regulatory information can include information required by other government agencies overseeing a specific type of goods imported into a respective country. The CBP recognizes such information as Partner Government Agency (PGA) information, and examples of PGAs in the U.S. include the Food and Drug Administration (FDA), and the Environmental Protection Agency (EPA). The tariff schedule 36 will include the required regulatory information of a given PGA, including a PGA specific goods classification system and other data requirements, of which may be required to be transmitted with a customs entry form for an in-bound shipment to be cleared. The tariff schedule 36 can also include regulatory information such as a specified duty rate for applicable Antidumping and Countervailing Duties (AD/CVD), and various commodity-specific import licenses, such as a steel license, diamond certificate, and softwood lumber declaration.

The flagged exceptions data 38 includes information regarding the types of negative comments, i.e. flagged exceptions, that can be received from a respective customs agency regarding a submitted entry form, and the associated mitigating measures to help best resolve the identified exceptions. The flagged exceptions data 38 is further categorized by those exceptions that can be resolved by the system automatically, and those exceptions that require some sort of custom broker 28 assistance for resolution. Examples of the exceptions flagged by the CBP in the U.S. include:

| System Automated Response | Customs-Broker Resource Response Required |
|---|---|
| Document Required | No Bill Match |
| Commodity Specialist Team Approval Required | Manifest Hold CBP |
| | Manifest Hold Agriculture |
| In-Bond Number Not On File | CBP Hold |
| Automated Manifest System (AMS) | Pending Intensive Exam |
| Flight Not Departed | PGA Hold Intact |
| Quantity Is More Than Manifested Bill Quantity | Data Rejected Per PGA Review |
| Request the Entry Summary Package | |
| Request for Specific Documents | |

It will be appreciated that data of the DBMS 14 can be combined into different database configurations in other embodiments of this invention. Additional information regarding these databases will be discussed throughout this description. The data stored on the data storage assembly can be read, written, and executed by the various components, servers and modules included in the system.

Figure 3:
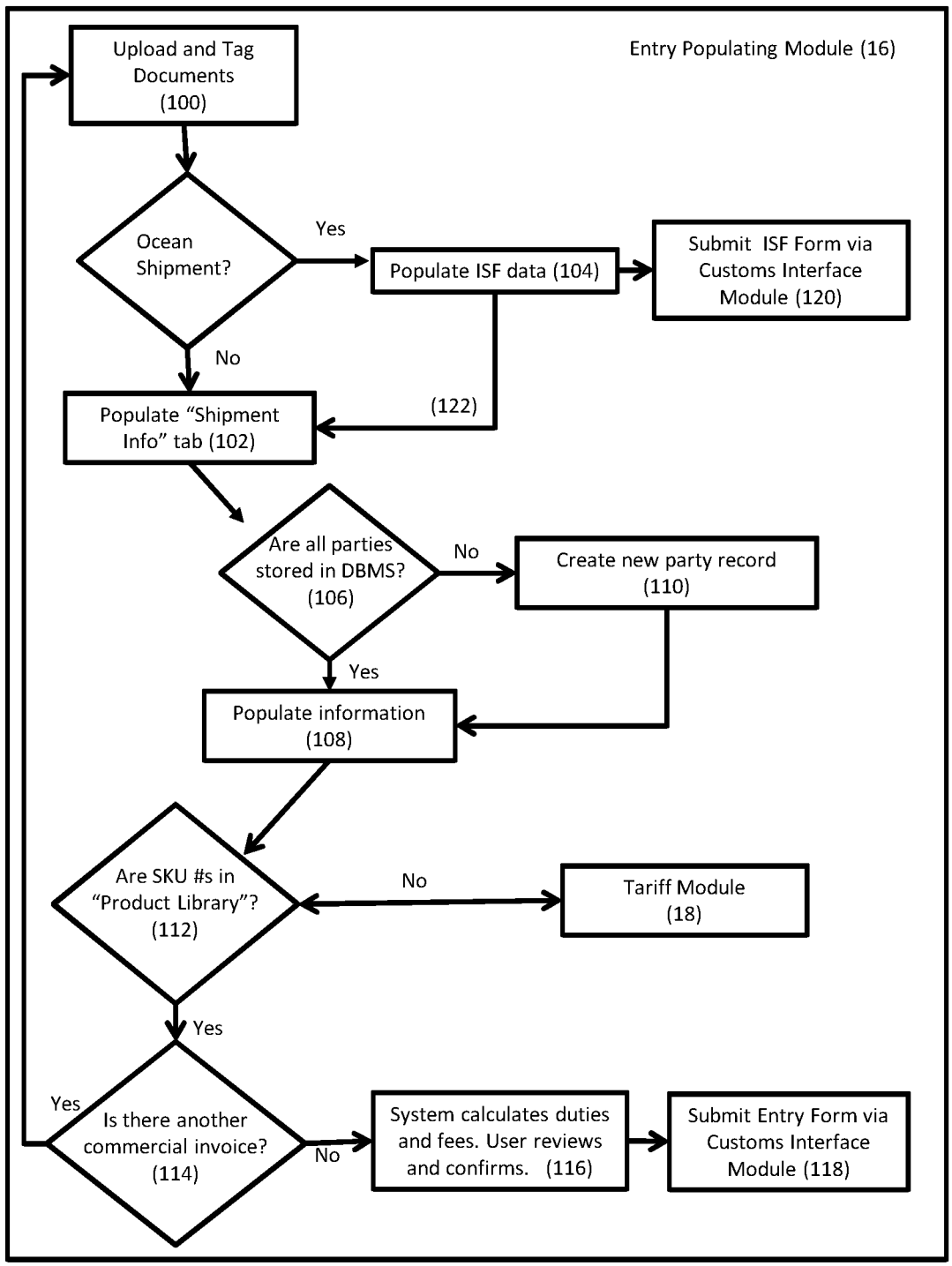
FIG. 3 depicts a flowchart for the entry population module operation of the system in FIG. 1.
Figure 9A:
FIG. 9A depicts a screenshot of the entry populating module of the system in FIG. 1 depicting the importer information populated.
Figure 9C:
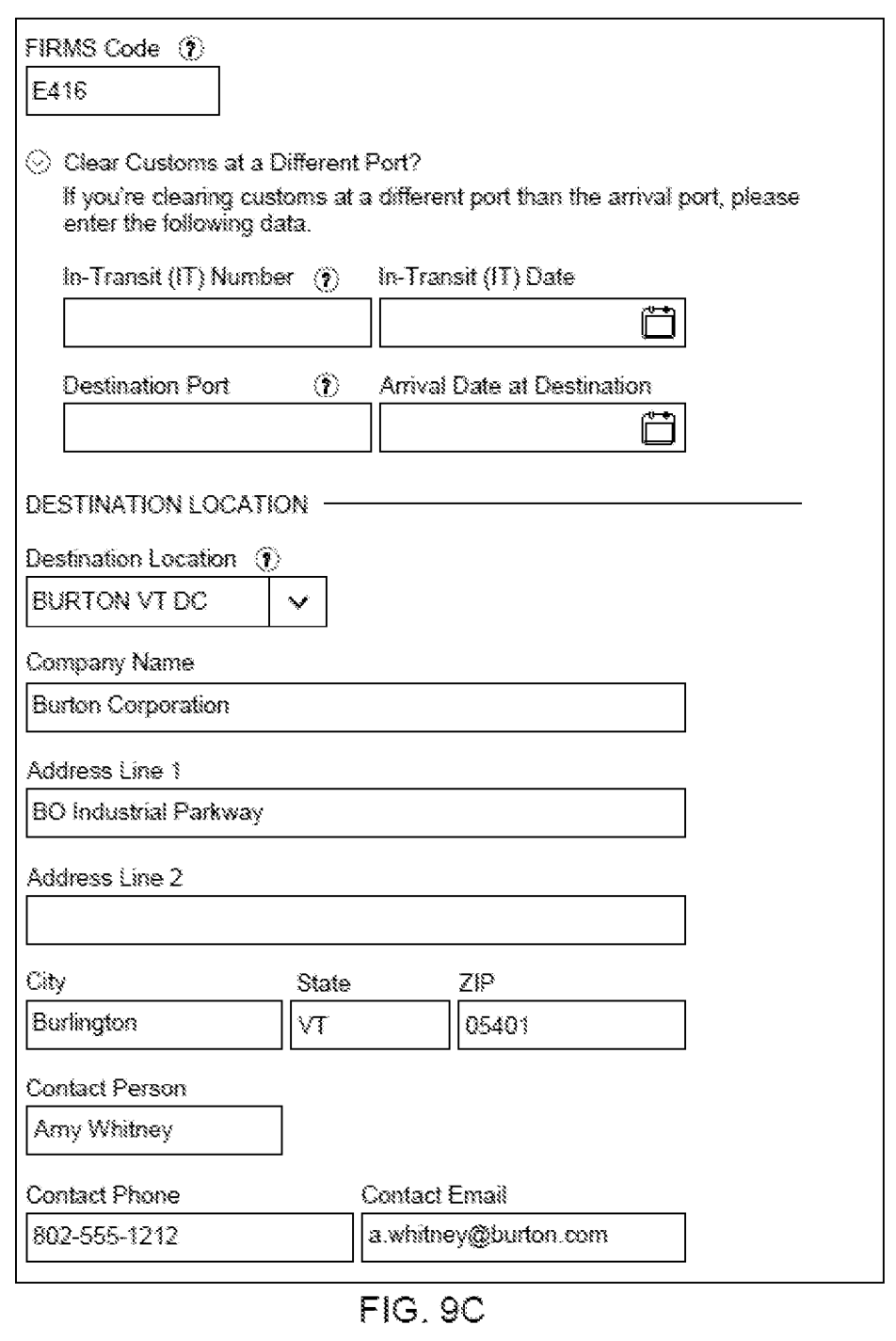

With reference now to FIG. 3, there is shown a method and an exemplary operational flowchart of the entry populating module 16, which provides a platform for a user to complete a customs entry form for a desired in-bound shipment. The structure of the platform to populate an entry form can depend on the respective customs agency requirements. For example, in the U.S., the CBP mandates the software requirements that must be adhered for an Automated Broker Interface (ABI) platform to be compatible with the CBP customs entry form interface platform, i.e. ACE. The ABI platform is specified to contain entry fields that pertain to information required for a customs entry form, wherein some entry fields are conditional depending on the type of goods imported. Each country will specify the information required to make up a complete and accurate customs entry form. For the U.S., a basic customs entry form can include importer name and address, importing carrier, country of origin, import/export date, manufacturer information, and goods information such as the corresponding tariff code, quantity of goods imported, value of goods imported, other duties and fees, and a final duty to be paid by the importer. FIGS. 9A-C depict screenshots of the system with CBP entry form information populated, such as importer information with a selected good to be imported (FIG. 9A), more detailed information regarding the good to be imported (FIG. 9B), and information regarding the final destination (FIG. 9C). Moreover, as aforementioned, a given country may require regulatory information from other government agencies or entities to be transmitted with a customs entry form, such as PGA data. The PGA data, populated using respective entry fields, is submitted to ACE for access by the respective government agency. Examples of required information to be submitted to the FDA can include a FDA-specific goods classification code and goods description, country of origin, manufacturer, shipper and applicable regulatory compliance indication.

With reference to FIG. 3, the entry populating 16 module will first access the user's profile via the DBMS 14 that contains importer information 32, and the importer's product library 34. The user will subsequently upload and tag 100 the necessary documents for importing, which includes a bill of lading and commercial invoices. For some countries, such as the U.S., an oceanic import will require the user to first populate and submit an Importer Security Filing (ISF) 104,120 to the respective customs agency prior to the goods departing from an originating country. For other types of import, or for other countries, the user will be first prompted to populate the shipment information 102. Both the shipment information 102 and/or ISF information 104 can be populated using the uploaded documents, such as a commercial invoice. In countries where an ISF must be submitted 120, the software can retrieve relevant information from an ocean carrier's site, via the digital network, and automatically input such information 122 into the customs entry form. Additionally, populating the shipment information will commence the periodic queries by the system to a government agency to ensure a master bill and house bill are on file, as submitted by a freight forwarder, and that a match between these two bills exist (not shown). For the U.S., the CBP requires a bill to be on file in order for an entry form to be filed against that bill.

Once the shipment information 102 and any applicable updates 106,110 to the importer data 32 has been made, such as supplying/generating a manufacturer and/or establishment identification number, the in-bound goods information 108 is populated wherein the user 30 selects the respective goods SKU number associated with the importer. The respective goods SKU number, as contained in the product library 34, is associated with a corresponding tariff code that has been validated along with the applicable regulatory information and any associated fees/duties. If the SKU number does not exist 112 in the product library 34, the tariff module 18 will be accessed for goods classification, regulatory requirements determination, and product library 34 update (see discussion below). Once the respective goods SKU number record has been created in the product library 34, the entry-populating module 16 will access the necessary entry form information, including regulatory information, to populate the respective entry fields in a customs entry form. The only information required from a user after the SKU number has been entered is typically the quantity and value of the imported goods. In an alternative embodiment, the system may obtain such information automatically from an uploaded document through the use of an Enterprise Resource Planning (ERP) software (not shown). Examples of ERP software include Netsuite, Oracle, and Microsoft Dynamic. The system will revert back to step 106 if the user has multiple commercial invoices 114 to be considered, provided any required documents has already been uploaded (step 100).

In some instances, an assist module will be accessed (not shown) within the entry populating module 16, allowing a user to enter an "assist" value to the goods, which will be in addition to the goods invoice value. An assist value is the value of any material, including machinery, that was provided by an importer to a manufacturer free of charge, and such material was used in the production of the desired in-bound goods. Using the assist module, the user is able to determine how the assist value can be distributed for each entry filed for the desired in-bound goods. An example of the distribution methods includes adding the entire assist value to a single item of the imported goods, such as a single screw, or distributing the assist value equally to the quantity of the goods imported, such as a total number of screws imported each with an incremental increase in value.

Once all the information has been entered, the system will tabulate 116 the associated duties and fees, and allow the user to review the information for accuracy. Once the information has been reviewed and verified, the user can submit 118 the completed entry form to a remote customs server 26 via the customs interface module 20.

Figure 4:
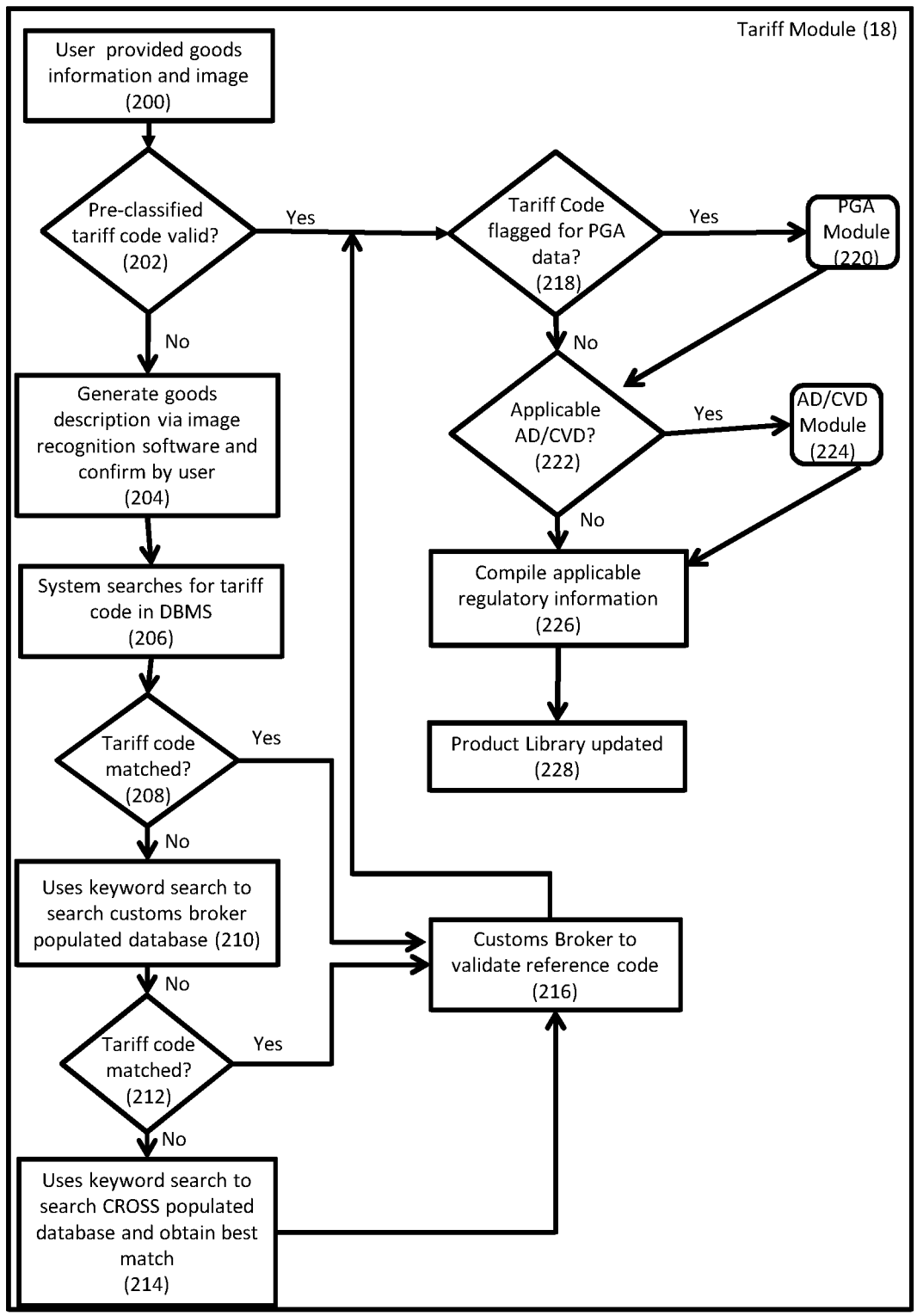
FIG. 4 depicts a flowchart for the tariff module operation of the system in FIG. 1.

With reference now to FIG. 4, there is shown a method and exemplary operational flowchart of the tariff module 18, which provides a platform for a user to validate, and/or classify goods according to a tariff code. The tariff module 18 further enables the user to determine the applicable regulatory information and associated fees to be included with the filing of a respective customs entry form. The user is first prompted to upload an image 200 of the desired goods to be stored with the product library 34. If the user has pre-determined the tariff code, the tariff module 18 will ensure 202 that a valid code was selected prior to determining the associated regulatory information (further described below).

However, if the user has not provided or determined a valid tariff code, the user can use the tariff module 18 to obtain a system determined tariff code that is subsequently validated by customs-broker resources 28. The tariff module will first utilize image recognition software embedded within the system to generate 204 a description of the goods using the image uploaded. Based on the user's confirmation and/or update of the goods description, the tariff module may conduct multiple searches to identify a corresponding tariff code: 1) the tariff module will search 206 the tariff schedule 36 to find a tariff code that contains a description matching the selected goods description; if a match 208 is not found, the tariff module will 2) use a key word search 210, based on the goods description, to search a system database populated by customs-broker resources with generic goods descriptions and related tariff codes; if a match 212 is still yet to be found, the tariff module will 3) conduct a keyword search 214 of a publicly available database, via the digital network 12, maintained by a respective customs agency containing text of pre-classification rulings—an example is the CROSS database from the CBP containing text for a majority of their Binding Rulings. In all the aforementioned searches, any tariff code identified will be relayed to customs-broker resources 28, via the digital network 12, for validation 216 to ensure the entry form reflects the correct goods.

Figure 7:
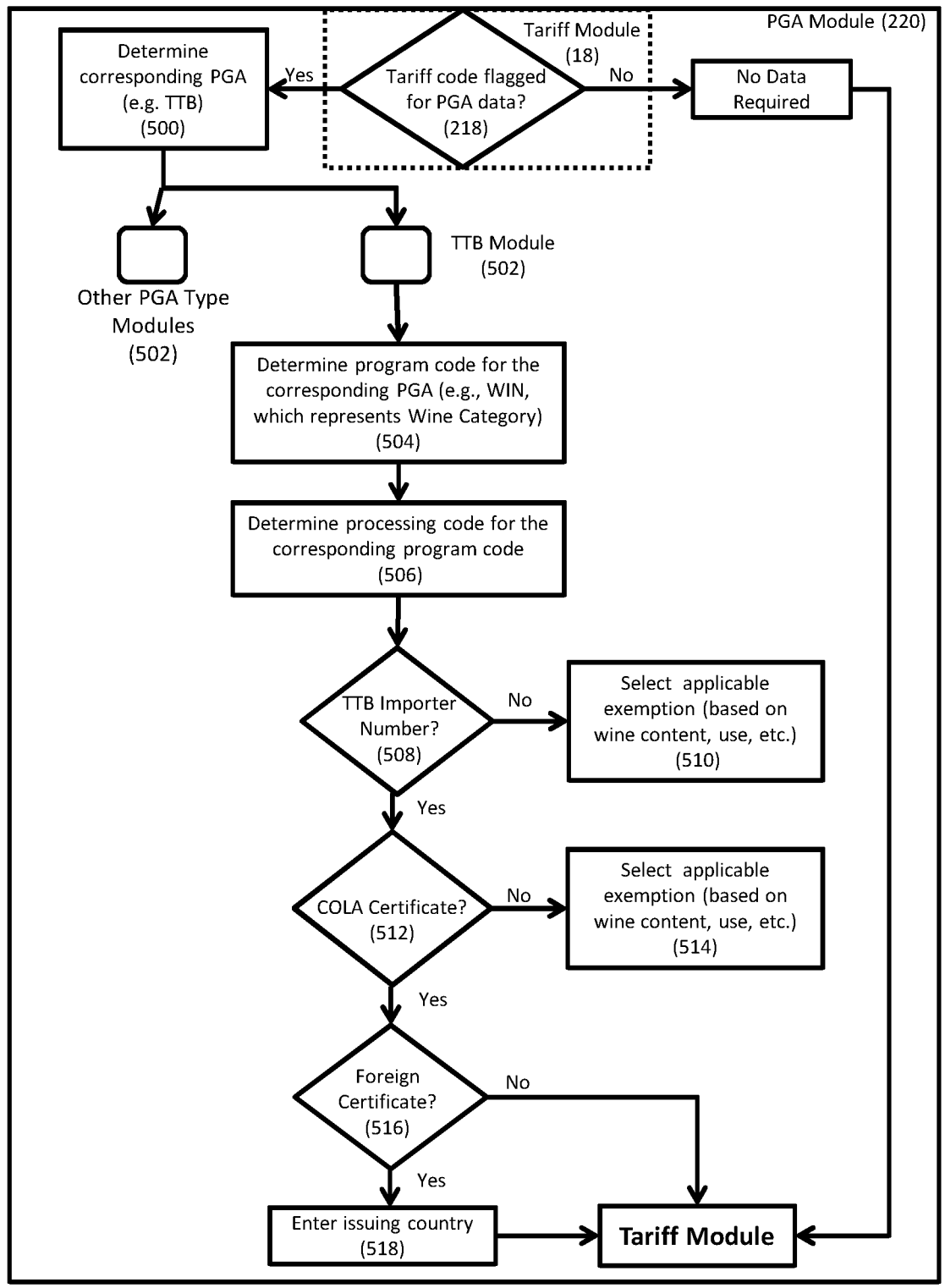
FIG. 7 depicts a flowchart for the PGA module operation of the system in FIG. 1.
Figure 8:
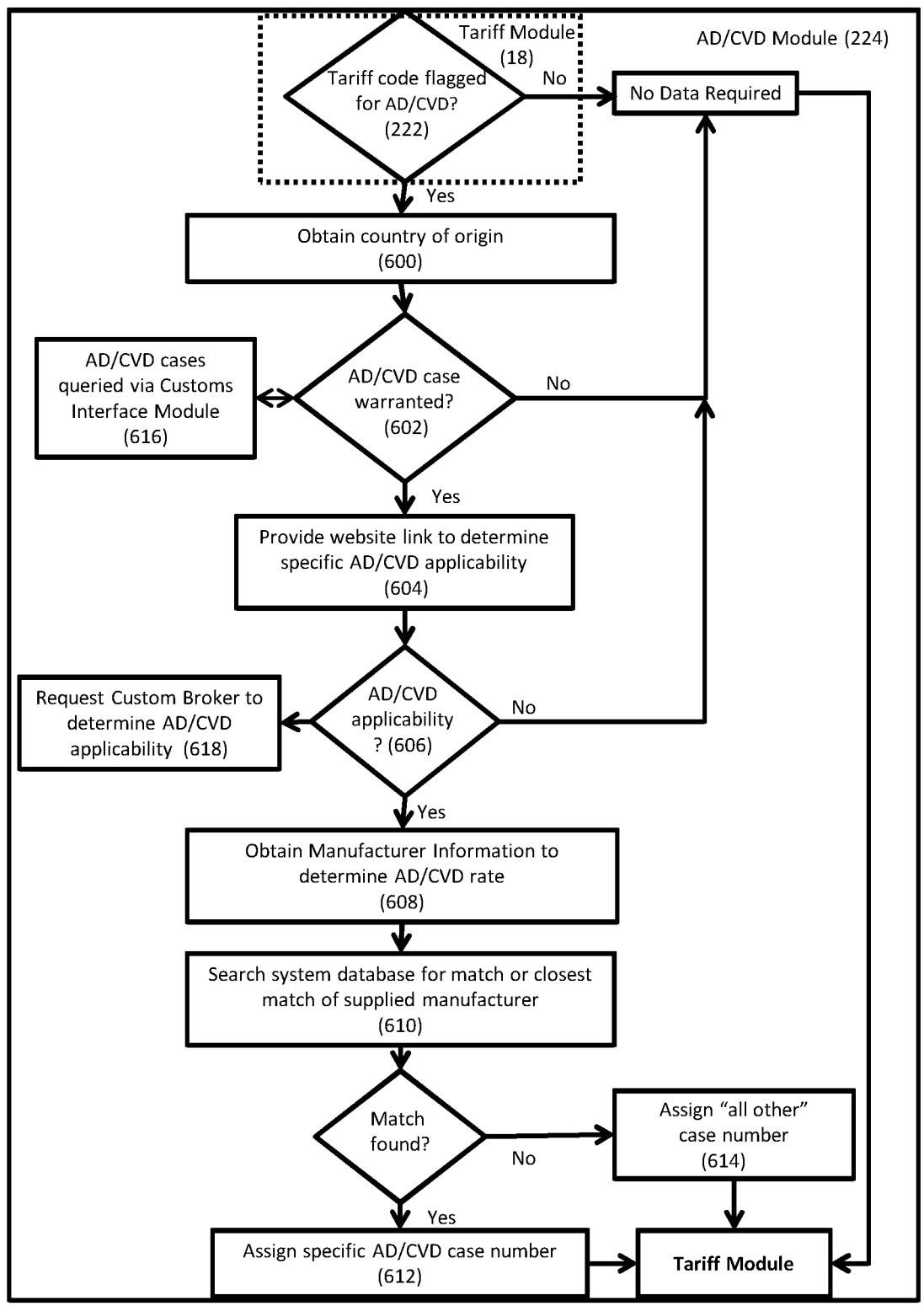
FIG. 8 depicts a flowchart for the AD/CVD module operation of the system in FIG. 1.

Once the tariff code has been determined, the tariff module 18 will determine the applicable regulatory information required to be filed with a customs entry form by accessing the DBMS 14, specifically the tariff schedule 36. In some cases, the applicability of regulatory requirements must be determined based on the type and source of the in-bound shipment. The tariff module 18 contains modules that will be used to walk a user through such a determination process, and store such information in the product library 34 for future use. In the case of an in-bound shipment to the U.S., two modules are employed by the tariff module 18 for determining applicable regulatory requirements: 1) the PGA module 220 and 2) the AD/CVD module 224. FIG. 7 and FIG. 8 depict a method and exemplary operational flowchart of the PGA module 220 and AD/CVD module 224 respectively, which are described in detail below.

With reference now to FIG. 7, the tariff module 18, upon determining 218 that the identified tariff code is flagged and regulated by an applicable PGA, will invoke the PGA module 220 to determine if any regulatory information is required with the customs entry form. The PGA module 220 will first determine, via the DBMS 14, which PGA(s) 500 are associated with the tariff code, and subsequently invoke a corresponding number of PGA-Type modules 502 within the PGA module 220 for each applicable PGA. Each PGA-Type module 502 within the PGA module 220 will use a combination of automated logic and user inputted information to determine if any regulatory information is required. For the U.S., the following PGA-Type modules 502 are located within the PGA module 220:

| PGA-Type Modules for In-Bound Shipment to the U.S.: | |
| --- | --- |
| Animal and Plant Health Inspection Services (APHIS) | National Marine Fisheries Service (NMFS) |
| | Office of Marine Conservation (OMC) |
| Department of Agriculture (USDA) | National Highway Traffic Safety Administration (NHTSA) |
| | Drug Enforcement Administration (DEA) |
| Environmental Protection Agency (EPA) | Fish and Wildlife Services (FWS) |
| | Alcohol and Tobacco Tax and Trade Bureau (TTB) |
| Food Safety and Inspection Service (FSIS) | Lacey Act Compliance |
| Food and Drug Administration (FDA) | |

The exemplary PGA-Type module 502 in FIG. 7 depicts an in-bound shipment to the U.S. with a tariff code that is associated with the Alcohol and Tobacco Tax and Trade Bureau (TTB). The TTB module 502 will use the identified tariff code to determine, via the DBMS 14, the specific program code 504, and subsequently the specific processing code 506, which are sub-classifications under the respective PGA. Examples of TTB categories that program codes 504 represent include wines, beers, tobacco, etc. Examples of categories that processing codes 506 represent for a given program code, such as wines, include port wine, champagne, etc. Upon determining the processing code 506, the TTB module 502 obtains from the user a TTB importer number 508 and/or COLA number 512, if available, otherwise obtains from the user any applicable exceptions 510,514. Finally, the TTB module 502 obtains from the user the name of an issuing country 518 if a foreign certificate 516 for the goods is available. The TTB module subsequently 502 sends the information to the tariff module 18 for inclusion in the product library 34 (described below).

With reference now to FIG. 8, the tariff module 18, upon determining 222 that the identified tariff code is flagged as potentially associated with AD/CVD, will invoke the AD/CVD module 224 to determine if any duties and other regulatory information is required with the customs entry form. The AD/CVD 224 module will first determine whether the combination of the tariff code and country of origin 600 has been listed on an existing AD/CVD case 602. The AD/CVD module will query 616 such cases daily from a respective customs agency to ensure any changes in AD/CVD applicability are properly considered. Upon determining that the tariff code and originating country combination are present in an existing AD/CVD case, the user will be directed to a web site 604 providing specific information about the applicability of AD/CVD, of which the user will use to determine whether the respective goods is applicable thereof. An example of a website containing such information is the International Trade Administration website, applicable for the U.S. The user may instead request 618 customs-broker resources 28 to complete the determination process, including determining any associated fees and duties. If however the user 30 determines that the respective goods is applicable to AD/CVD, the user 30 will provide information regarding the manufacturer 608, such as name and address, which the AD/CVD module 224 will subsequently compare 610 against a system 10 database containing AD/CVD case numbers and corresponding rate information. The system 10 database can be reflective of information available in a public database such as the Federal Register Notices for the U.S. The assigned AD/CVD case number will be used by the AD/CVD module 224 to apply the specific AD/CVD rate 612. If neither a match nor a close match is found in the system database, a generic "all other" case number 614 may be applied. The tariff module 18 will use this information to compute the total applicable AD/CVD fees.

With reference now to FIG. 4, the tariff module 18 will compile 226 any regulatory information and associated fees determined from the PGA module 220, AD/CVD module 224, and from any other applicable government agencies/entities, and include such information with the new goods recorded 228 in the product library 34. As such, the user need only reference the SKU number to access all such required information to be filed with a customs entry form.

In an alternative embodiment, the user may, after uploading and tagging the required documents for an in-bound shipment and prior to submitting an entry form, opt for customs-broker resources to complete the entry form, including the required goods classification and determination of regulatory information.

The customs interface module 20 will act as an interface between the system 10 and a respective remote customs server 26, via the digital network 12. As aforementioned, an example of a remote customs server is ACE, used by the CBP in the U.S. The customs interface module 20 will enable the user to transmit a completed entry form to the remote customs server 26, as well as provide the ability to approve or change the computed tariffs and fees. The customs interface module 20 will provide real-time status updates from the remote customs server 26, translated and viewable by the user 30 using a user device. This includes receiving any comments, such as flagged exceptions, or approvals from the respective customs agency.

Figure 5:
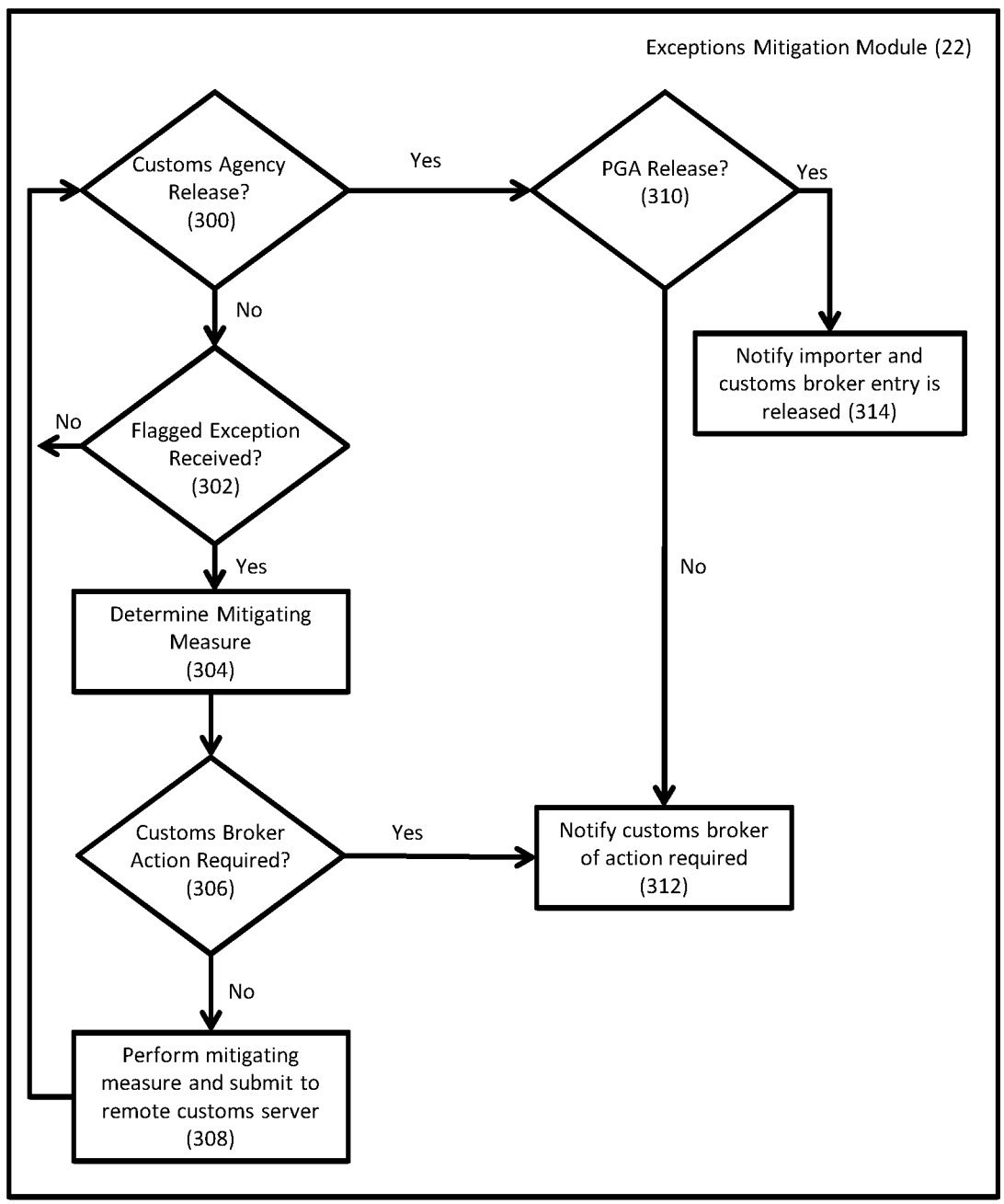
FIG. 5 depicts a flowchart for the exceptions mitigation module operation of the system in FIG. 1.

With reference now to FIG. 5, there is shown a method and operational flowchart of the exceptions mitigation module 22 in determining the system action needed to mitigate any flagged exceptions received from a respective customs agency. The exceptions mitigation module 22 will first query 300 a remote customs server 26 to determine if the respective entry has been released by a customs agency. If the exceptions module determines that the customs agency has not released the entry, the module will query 302 for any flagged exceptions, and continue to do so until either the customs agency releases the entry or a flagged exception is identified. Using the flagged exceptions data 38 in the DBMS 14, the exceptions mitigation module 22 will correspond 304 the received flagged exception with a required mitigation measure, which can be either entirely system automated, or require some level of input by customs-broker resources 28 for a resolution. For example, if the exception received is "Document Required," wherein the required document has been identified, the exceptions mitigation module 22 will determine 306 via the DBMS that the exception can be resolved by the system automatically, and execute the follow-up action 308. In this example, the follow-up action consists of the system automatically submitting the required documentation if it is tagged among the entry documents, such as a commercial invoice. If instead, the comment received is "Data Rejected per PGA Review," the system will determine 306 via the DBMS that the mitigating measure is to send a notification to customs-broker resources 28 for a resolution 312. In some instances (not shown), the mitigating measure will require the system to act, such as deciphering the type of hold on the goods and/or supplying information, while simultaneously, the system will notify customs-broker resources 28 for additional required action. The exceptions mitigation module 22 will communicate with customs-broker resources 28 via the digital network 12, and submit any mitigating measures to a remote customs server 26 via the customs interface module 20.

Once the customs agency has released the goods, the exceptions module 22 will subsequently query 310 to see if any applicable PGAs have released the goods. If the goods are held by any PGA, the module will notify customs-broker resources 28 for a resolution 312.

Once all such flagged exceptions have been cleared, the system will display the entry as being released 314 and notify the user 30 and customs-broker resources 28. The summary packet module 40 (not shown) will subsequently create an entry summary packet comprising of information associated with the entry form release, such as the completed entry form, customs release form, and the associated uploaded and tagged documents. The summary packet module 40 will retain this information for the minimum length of time as prescribed by the respective country. For example, the CBP mandates that all information related to a released shipment is susceptible to an audit within 5 years of the entry date. Thus, the summary packet module 40 will ensure a released entry form is readily accessible by a user for a minimum of 5 years. The summary packet module 40 is also capable of generating a spreadsheet report regarding information transmitted to a customs agency for a given released entry form.

Figure 6:
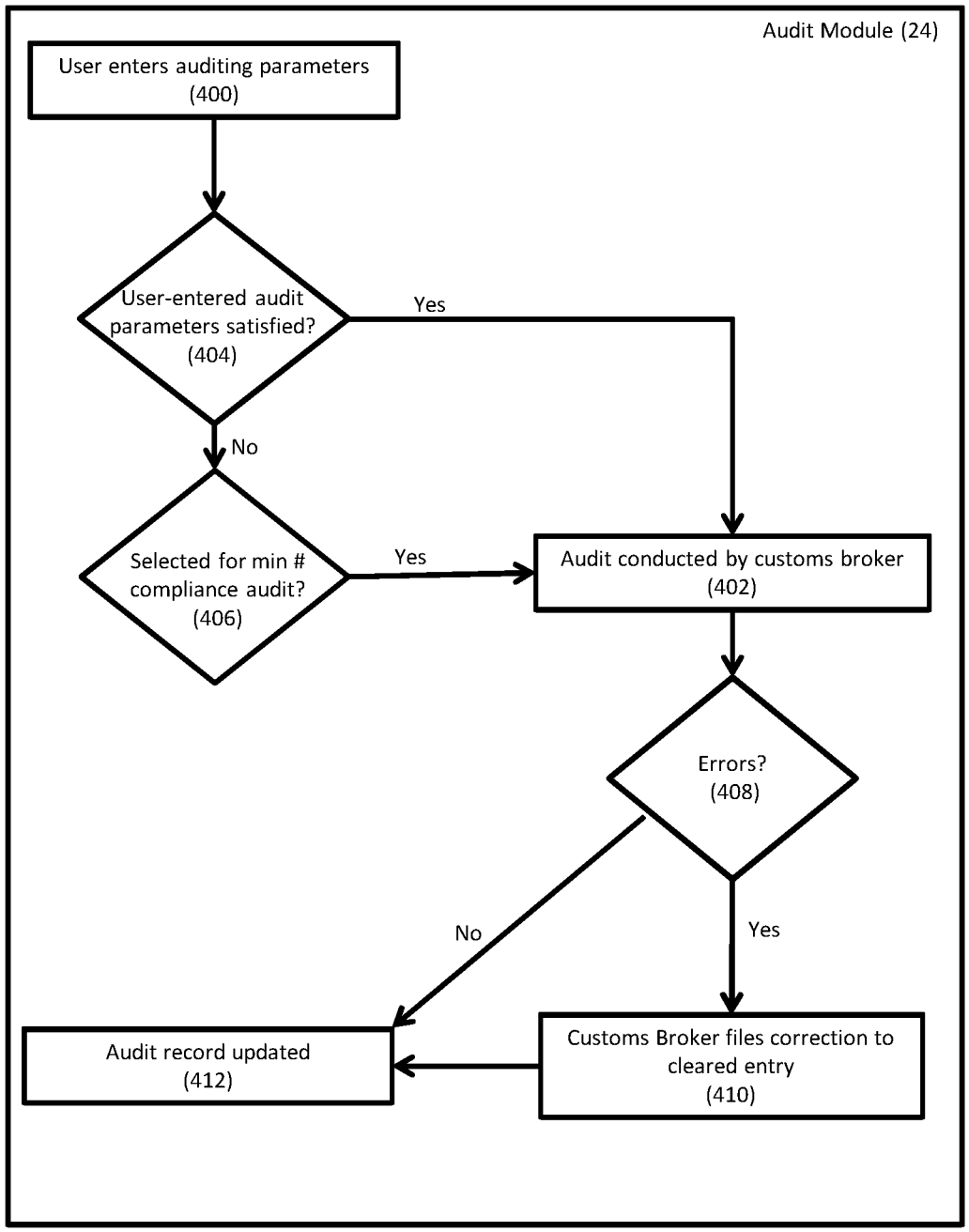
FIG. 6 depicts a flowchart for the audit module operation of the system in FIG. 1.

With reference now to FIG. 6, there is shown a method and exemplary flowchart of the audit module 24 which allows for an entry summary packet to be audited 402 by customs-broker resources 28 to ensure accuracy. The audit module 24 will enable the user 30 to set the frequency of entry fields to be audited, where the minimum frequency is 2% of all entry fields submitted. The user can further specify a more detailed audit for different types of goods, by specifying parameters 400 that the audit module 24 will search for in an entry summary packet to determine 404 which goods and subsequent entry fields qualify for such an audit 402. These parameters can include those that the user 30 or system 10 have identified with a high risk of being erroneously entered or audited by a customs agency in the future. If no parameters are found that warrant an entry form audit, the audit module 24 will randomly select 406 a number of entry fields for auditing 402, wherein the number selected corresponds to the specified minimum compliance audit frequency, which as aforementioned is 2% by default. Any corrections needed 408 after the audit is complete will be addressed by customs-broker resources 28 and submitted 410 to the remote customs server 26 via the digital network. For example, any such corrections to a cleared customs form in the U.S. will be submitted via the Post Summary Correction process using ACE.

In an alternate embodiment, the system 10 can also be configured to relay required documents to facilitate post-clearance transport 42. This includes the system 10 generating an automated email to notify a container freight station (CFS) regarding cargo release and entry form clearance. Moreover, the system can be configured for a user to select a trucker, and enable a delivery order to be sent to a selected trucker, via the digital network 12.

Connections between components are shown using double-sided arrows, which may be physical, fiber optic, wireless, or any other type of communications link over a network. The network can be any of a variety of conventional network topologies and types (including optical, wired and/or wireless networks), using a variety of conventional network protocols (including public and/or proprietary protocols). The network can include, for example, home networks, cellular networks, corporate networks, Intranet(s), or the Internet, as well as possibly at least portions of one or more local area networks (LANs) and/or wide area networks (WANs) or telephone networks, among others.

The user devices that may be any of a variety of digital devices, including, for example, and not limitation, a desktop PC, a notebook or portable computer, a workstation, an Internet appliance, a handheld PC, a cellular telephone or other wireless communications device, a personal digital assistant (PDA), a set-top box, or combinations thereof. Other hardware components capable of digitally communicating and interacting with the system can be used without departing from the invention.

The system 10 can incorporate a database management system (DBMS) 14 configured to store system information in digital format utilizing hardware known in the art, such as hard drive, random access memory, read only memory, flash memory, cache memory, a portable magnetic computer diskette, such as a floppy diskette, zip disk, and/or other configurations capable of storing programming, data, or other digital information on hardware devices, whether co-located or distributed across a network. The term "database management system (DBMS)" is inclusive of one or more database systems. Moreover, other hardware components capable of digitally communicating and interacting with the system can be used without departing from the invention.

The system 10 is arranged to process data, control data access and storage, issue commands, and control other desired operations, including the various modules individually and collectively (e.g., 14, 16, 18, 20, 22, 24, and 40). The system includes a processor assembly having processing circuitry configured to implement desired programming. For example, processing circuitry (hardware) may be implemented as one or more of a processor and/or other structure configured to execute executable instructions including, for example, software and/or firmware instructions, and/or hardware circuitry. Exemplary embodiments of processing circuitry include hardware logic, state machines, and/or other structures alone or in combination with a processor. Storage circuitry is configured to store programming such as executable code or instructions (e.g., software and/or firmware), electronic data, databases, or other digital information and may include processor-usable media. Processor-usable media may be embodied in any computer program, product(s), or article of manufacture(s) that can contain, store, or maintain programming, data, and/or digital information for use by or in connection with an instruction execution system including processing circuitry in the exemplary embodiment. System capabilities (including processing, data processing, data storage, module features, and others) of the system can be co-located or distributed across a network (including internet) without departing from the invention.

It will be understood that when components, apparatus, appliance, functions, steps or elements of this invention need to be or may be implemented on a data processing apparatus as a whole, or any individual component thereof described herein, that the apparatus or any individual component as described herein may be utilized within the contemplation of this invention. For instance, if a flowchart as described herein expressly or implicitly requires for example that a processor or storage for example be utilized, the applicable components described herein may be so utilized even if not specifically recited for that step.

It should be appreciated from the foregoing that the present invention provides a computerized system and method that enables an importer to complete and self-file a customs entry form, wherein the system and method address a flagged exception by a customs agency either through an automated system executed action, or through system notification to customs-broker resources for resolution. The system further assigns entries of a cleared entry form to be audited by customs-broker resources, wherein the level of auditing is determined by the user. As such, the submission and filing of customs entry forms can be pursued by any interested user e.g., individual, and/or organization, while maintaining customs-broker resources on the back-end to resolve issues with a customs agency and/or for selective auditing.

The present invention has been described above in terms of presently preferred embodiments so that an understanding of the present invention can be conveyed. However, there are other embodiments not specifically described herein for which the present invention is applicable. Therefore, the present invention should not to be seen as limited to the forms shown, which is to be considered illustrative rather than restrictive.

What is claimed is:

1. A network-based system for submitting customs entry forms and resolving issues thereof, comprising:
   a database management system (DBMS) that maintains importer data, a product library data, a tariff schedule data, and flagged exceptions data;
   an entry-populating module, in digital communication with the DBMS, wherein the entry-populating module:
   receives user-supplied information, from a user via a digital network, pertaining to an importer and goods to be imported;
   accesses parameters, from the DBMS, for the importer data and the product library data, for the importer and the goods to be imported;
   identifies a plurality of empty fields for a customs entry form;
   populates said empty fields with corresponding data from the user-supplied information and the accessed parameters; and
   computes required tariffs and fees associated with the goods to be imported;
   a customs interface module, in digital communication with a remote customs server via the digital network, wherein the customs interface module:
   transmits information to the remote customs server, including said customs entryform;
   and receives information from the remote customs server, including cargo release approval status and flagged exceptions;
   an exceptions mitigation module, in digital communication with the DBMS, wherein the exceptions mitigation module:
   receives flagged exceptions from a remote customs server, via the customs interface module;
   accesses parameters, from the DBMS, for the flagged exceptions data, for identifying mitigations measures for the received flagged exceptions;
   automatically executes a first mitigation measure for a first flagged exception by identifying and submitting a requisite document, and a second mitigation measure by transmitting instructions to the entry-populating module to modify at least one populated field; and
   an audit module, in communication with the DBMS, wherein the audit module:
   receives user supplied auditing criteria for a customs entry form, the user supplied auditing criteria specifying parameters pertaining to the goods to be imported;
   identifies a plurality of populated fields for the customs entry form, for auditing, based on a) the user supplied auditing criteria, orb) a prescribed percentage of the populated fields submitted to the remote customs server; and
   transmits the data associated with the identified populated fields to a customs-broker resource, for auditing, via the digital network.

2. The network-based system as defined in claim 1, further comprising a tariff module, in communication with the DBMS, that:
   receives an image from the user, wherein the image pertains to the goods to be imported;
   generates a description of the goods to be imported using an image recognition software contained within the network-based system, for identifying the goods to be imported based on the image;
   accesses 1) the tariff schedule data from the DBMS, and/or 2) a customs-resource database contained within the network-based system, and/or 3) a public government database via the digital network, for obtaining a plurality of generic goods characterizations that are each associated with a respective tariff code;
   determines a goods tariff code for the goods to be imported by matching a description of the goods to be imported with one of the plurality of generic goods characterizations obtained with a respective tariff code;
   validates the goods tariff code with the customs-broker resource, via the digital network;
   retrieves a first set of customs entry form parameters by accessing the tariff schedule data, from the DBMS, for parameters associated with the goods tariff code;
   computes a first duty rate for the goods to be imported based on the first set of customs entry form parameters; and
   configures the first set of customs entry form parameters and the first duty rate to be assigned in the product library data, within the DBMS, for association with the goods to be imported.

3. The network-based system as defined in claim 2, wherein the user validates the description of the goods to be imported generated by the image recognition software.

4. The network-based system as defined in claim 2, wherein the customs-broker resource determines the goods tariff code.

5. The network-based system as defined in claim 2, the tariff module further comprising a partner government agency (PGA) module, in communication with the DBMS, the PGA module comprising a plurality of PGA-Type modules, wherein the PGA module will access the DBMS, for the tariff schedule data, to determine the PGA-Type module(s) associated with the goods tariff code, each PGA-Type module, representing a specific PGA, that:
   identifies a PGA specific goods code associated with the goods tariff code by accessing the DBMS, for the tariff schedule data; receives user-supplied PGA information, via the digital network, pertaining to specific PGA requirements as identified via the tariff schedule; configures a second set of customs entry form parameters based on the PGA specific goods code and user-supplied PGA information; and
   the second set of customs entry form parameters to the tariff module to be merged with the first set of customs entry form parameters.

6. The network-based system as defined in claim 2, the tariff module further comprising an anti-dumping and countervailing duties (AD/CVD) module, in communication with the DBMS, the AD/CVD module that:
   identifies existing AD/CVD cases, via the remote customs server, that relate to the goods tariff code and corresponding goods country of origin;
   links the user, via the digital network, to guidance information relating to the applicability of AD/CVD for the goods tariff code and corresponding goods country of origin;
   receives user-supplied AD/CVD information pertaining to the goods to be imported; determines an AD/CVD rate for the goods to be imported by 1) accessing an AD/CVD rate database, within the network-based system, for obtaining rate information, and 2) matching parameters of the user-supplied AD/CVD information with corresponding rate information parameters;
   configures a third set of customs entry form parameters and a second duty rate based on the AD/CVD rate; and relays the third set of customs entry form parameters and the second duty rate to the tariff module to be merged with the first set of customs entry form parameters and the first duty rate respectively.

7. The network-based system as defined in claim 6, wherein the AD/CVD module determines an AD/CVD rate based on accessing an AD/CVD rate database for obtaining generic rate information.

8. The network-based system as defined in claim 1, further comprising a summary packet module, in communication with the DBMS, that:
   receives a customs agency shipment release form via the customs interface module;
   creates an entry summary packet comprising of the customs agency shipment release form, the transmitted customs entry form, and the user-supplied information relating to the goods to be imported; and
   records and maintains the entry summary packet within the summary packet module for a minimum pre-determined length of time, wherein the entry summary packet can be accessed by the user at any time, and outputted as a single document.

9. A network-based method for submitting customs entry forms and resolving issues thereof, comprising:
   receiving user-supplied information from a user via a digital network, pertaining to an importer and goods to be imported;
   accessing parameters from a database management system (DBMS), for importer data and product library data stored thereof, for the importer and the goods to be imported;
   identifying a plurality of empty fields for a customs entry form; populating said empty fields with corresponding data from the user-supplied information and the accessed parameters, via an entry populating module;
   computing required tariffs and fees associated with the goods to be imported;
   transmitting information to a remote customs server, including said customs entry form, via a customs interface module that is in digital communication with the remote customs server via the digital network;
   receiving information from the remote customs server, including cargo release approval status and flagged exceptions;
   accessing parameters, from the DBMS, for flagged exceptions data, for identifying mitigations measures for the received flagged exceptions;
   automatically executing, via an exceptions module, a first mitigation measure for a first flagged exception by identifying a requisite document, and a second mitigation measure by transmitting instructions to the entry-populating module to modify at least one populated field;
   receiving, via a summary packet module, a customs agency shipment release form via the customs interface module;
   creating, via a summary packet module, an entry summary packet comprising of the customs agency shipment release form, the transmitted customs entry form, and the user-supplied information relating to the goods; and
   recording and maintaining, via a summary packet module, the entry summary packet within the summary packet module for a minimum pre-determined length of time, wherein the entry summary packet can be accessed by the user at any time, and outputted as a single document.

10. The network-based method as defined in claim 9, wherein an audit module in communication with the DBMS is used for:
    receiving user supplied auditing criteria for a customs entry form, the user supplied auditing criteria specifying parameters pertaining to the goods to be imported;
    identifying a plurality of populated fields for the customs entryform, for auditing, based on a) the user supplied auditing criteria, and/or b) a pre-determined percentage of the populated fields submitted to the remote customs server, and transmitting data associated with the identified populated fields to the customs-broker resource, for auditing, via the digital network.

11. The network-based method as defined in claim 9, wherein a tariff module in communication with the DBMS is used for:
    receiving an image from the user, wherein the image pertains to the goods to be imported; generating a description of the goods to be imported using an image recognition software, for identifying the goods based on the image;
    accessing 1) a tariff schedule data from the DBMS, and/or 2) a customs-resource database via the digital network, or 3) a public government database via the digital network, for a plurality of generic goods characterizations that are each associated with a respective tariff code;
    determining a goods tariff code for the goods to be imported by matching a description of the goods to be imported with one of the plurality of generic goods characterizations obtained with a respective tariff code;
    validating the goods tariff code with the customs-broker resource, via the digital network;
    retrieving a first set of customs entry form parameters by accessing the tariff schedule data, from the DBMS, for parameters associated with the goods tariff code;
    computing a first duty rate for the goods to be imported based on the first set of customs entry form parameters; and
    configuring the first set of customs entry form parameters and the first duty rate to be assigned in the product library data, within the DBMS, for association with the goods to be imported.

12. The network-based method as defined in claim 11, wherein the user validates the description of the goods to be imported generated by the image recognition software.

13. The network-based method as defined in claim 11, wherein the customs-broker resource determines the goods tariff code instead of the tariff module.

14. The network-based method as defined in claim 11, wherein a partner government agency (PGA) module, in communication with the DBMS for accessing the tariff schedule data, is used for determining PGA-Type modules that are associated with a given goods tariff code, wherein each PGA-Type module, representing a specific PGA, is configured for:
    identifying a PGA specific goods code associated with the tariff goods code by accessing the DBMS, for the tariff schedule data;
    receiving user-supplied PGA information, via the digital network, pertaining to specific PGA requirements as identified via the tariff schedule data;
    configuring a second set of customs entry form parameters based on the PGA specific goods code and user-supplied PGA information; and relaying the second set of customs entry form parameters to the tariff module to be merged with the first set of customs entry form parameters.

15. The network-based method as defined in claim 11, wherein an anti-dumping and countervailing duties (AD/CVD) module, in communication with the DBMS, is used for:
    identifying existing AD/CVD cases, via the remote customs server, that relate to the goods tariff code and corresponding goods country of origin;
    linking the user, via the digital network, to guidance information relating to the applicability of AD/CVD to a specific goods tariff code and goods country of origin;
    receiving user-supplied AD/CVD information pertaining to the goods to be imported;
    determining an AD/CVD rate for the goods to be imported by 1) accessing an AD/CVD rate database, via the digital network, for obtaining rate information, and 2) matching parameters of the user-supplied AD/CVD information with corresponding rate information parameters;
    configuring a third set of customs entry form parameters and a second duty rate based on the AD/CVD rate; and
    relaying the third set of customs entry form parameters and the second duty rate to the tariff module to be merged with the first set of customs entry form parameters and the first duty rate respectively.

16. The network-based method as defined in claim 15, wherein an AD/CVD rate is based on generic rate information, obtained via an AD/CVD rate database.

* * * * *